(12) United States Patent
Harmon et al.

(10) Patent No.: US 8,344,879 B2
(45) Date of Patent: Jan. 1, 2013

(54) ASSET MANAGEMENT SYSTEMS AND METHODS

(75) Inventors: J. Scott Harmon, Portola Valley, CA (US); Gary J. Dennis, Duluth, GA (US)

(73) Assignee: Trimble Navigation Limited, Sunnyvale, CA (US)

(*) Notice: Subject to any disclaimer, the term of this patent is extended or adjusted under 35 U.S.C. 154(b) by 415 days.

(21) Appl. No.: 12/760,139

(22) Filed: Apr. 14, 2010

(65) Prior Publication Data
US 2010/0265061 A1    Oct. 21, 2010

Related U.S. Application Data

(60) Provisional application No. 61/169,693, filed on Apr. 15, 2009.

(51) Int. Cl.
G08B 1/08 (2006.01)
(52) U.S. Cl. .................. 340/539.13; 455/456.1
(58) Field of Classification Search ........... 340/539.13, 340/572.1, 10.1; 455/456.1, 456.3, 456.6; 701/519
See application file for complete search history.

(56) References Cited

U.S. PATENT DOCUMENTS

| | | | |
|---|---|---|---|
| 5,664,113 A | 9/1997 | Worger et al. | |
| 5,959,529 A | 9/1999 | Kail, IV | |
| 6,144,916 A | 11/2000 | Wood, Jr. et al. | |
| 6,225,901 B1 | 5/2001 | Kail, IV | |
| 6,519,529 B2 | 2/2003 | Doyle | |
| 6,697,735 B2 | 2/2004 | Doyle | |
| 6,871,160 B2 | 3/2005 | Jaw | |
| 6,940,403 B2 | 9/2005 | Kail, IV | |
| 6,985,803 B2 | 1/2006 | Abdel-Malek et al. | |
| 6,993,421 B2 | 1/2006 | Pillar et al. | |
| 7,043,402 B2 | 5/2006 | Phillips et al. | |
| 7,164,977 B2 | 1/2007 | Yakes et al. | |
| 7,184,866 B2 | 2/2007 | Squires et al. | |
| 7,212,829 B1* | 5/2007 | Lau et al. | 455/456.1 |
| 7,225,981 B2 | 6/2007 | Jongebloed | |
| 7,518,502 B2* | 4/2009 | Austin et al. | 340/539.13 |
| 7,809,377 B1* | 10/2010 | Lau et al. | 455/456.1 |
| 2002/0067256 A1 | 6/2002 | Kail, IV | |
| 2004/0243636 A1 | 12/2004 | Hasiewicz et al. | |
| 2005/0169310 A1 | 8/2005 | Knapp et al. | |
| 2006/0253590 A1* | 11/2006 | Nagy et al. | 709/226 |
| 2007/0139189 A1 | 6/2007 | Helmig | |
| 2007/0143207 A1 | 6/2007 | Breen | |
| 2007/0173993 A1 | 7/2007 | Nielsen et al. | |
| 2007/0262861 A1 | 11/2007 | Anderson et al. | |
| 2007/0285241 A1* | 12/2007 | Griebenow et al. | 340/572.1 |
| 2008/0144554 A1* | 6/2008 | Twitchell | 370/310 |
| 2009/0216775 A1* | 8/2009 | Ratliff et al. | 707/10 |
| 2010/0219939 A1* | 9/2010 | Twitchell, Jr. | 340/10.1 |

OTHER PUBLICATIONS

McCabe, Karen, "IEEE Approves 1902.1 Standard for Wireless Visibility Networks", Feb. 11, 2009, http://standards.ieee.org/announcements/pr_1902.1stdapproved.html.

* cited by examiner

Primary Examiner — John A Tweel, Jr.
(74) Attorney, Agent, or Firm — Swanson & Bratschun, L.L.C.

(57) ABSTRACT

Novel tools and techniques for tracking assets, such as high-value tools, customer equipment, testing equipment, technicians, and/or the like. Some of these tools and techniques can be used to track assets in a mobile environment (such as in a delivery truck, installation van, and/or the like).

45 Claims, 7 Drawing Sheets

| Tag ID | Status | Description | Photo | Serial No. | TimeStamp | Address |
|---|---|---|---|---|---|---|
| 213 | OK | Test Set | | 9495566 | 3/11/2008 14:45:31 | 123 W. Bellfort Ave. |
| 223 | Missing | Wrench | MISSING | 3641087 | 3/11/2008 08:43:07 | 345 Elm St. |
| 224 | Missing | DSL Modem | MISSING | 5248684 | 3/11/2008 07:55:02 | 987 Spruce Dr. |
| 334 | OK | Frequency Counter | | 7671117 | 3/11/2008 14:44:36 | 1337 Prince Court |
| 342 | OK | Laptop in AL Case | | 535045 | 3/11/2008 14:44:05 | Supply Depot |
| 354 | Missing | Grey Wire Spool | MISSING | 5924582 | 3/10/2008 12:08:00 | 487 Long Ave. |

FIG. 7

ASSET MANAGEMENT SYSTEMS AND METHODS

CROSS-REFERENCES TO RELATED APPLICATIONS

This application claims the benefit, under 35 U.S.C. §119 (e), of provisional U.S. Pat. App. Ser. No. 61/169,693, filed Apr. 15, 2009 by J. Scott Harmon et al. and titled "Asset Management Systems and Methods," the entire disclosure of which is hereby incorporated by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to asset management, and more particularly, to tools and techniques for managing assets in a mobile environment using attachable tracking devices.

BACKGROUND

Field asset management is an essential practice for organizations with a mobile workforce that uses, installs, and maintains high value assets in a service delivery role inventory, but it is also an area often overlooked in the company inventory management process. Control of high value assets, including without limitation, tools, test sets, computers, customer premise equipment, company facility equipment, technicians, vehicles, and circuit boards, is handled fairly well up to the point that those assets are sent to a technician work-reporting location and are "mobilized" in a technician vehicle. At that "point of mobility" however, documentation, inventory, control, and real-time information about high value items become a problem.

Today, there are many and various high value field asset management processes in use; typically, these processes involve paperwork inventories, bar code scanning, and computer or handheld inputs. The issue with paperwork-based, bar code scanning, and computer input accountability of high value assets in a mobile workforce environment is that such processes require manual effort by the technician. Far too often, the technician does not fill out the paperwork correctly or in a timely manner. Even the ease of bar code scanning takes extra effort and thus is prone to less than perfect accountability. Many radio frequency ("RF") solutions have limitations working in and around the metal that comprises a technician vehicle. Also, due to the nature of RF transceivers, it is difficult to contain the coverage to just that inside the vehicle so that items leaving the vehicle can be read as they leave the vehicle space.

Hence, there is a need for asset tracking for the mobile workforce that reduces or minimizes work effort for supervisors and technicians. It would be beneficial if the asset details were available in real-time so that a "current view" is available.

BRIEF SUMMARY

A set of embodiments provides tools and techniques for tracking assets, such as high-value tools, customer equipment, testing equipment, technicians, and/or the like. Specifically, in accordance with some embodiments, these tools and techniques can be used to track assets in a mobile environment (such as in a delivery truck, installation van, and/or the like). In particular embodiments, the tools and techniques may have particular value for a business with a mobile workforce, such as a utility, cable television provider, equipment installation and/or repair business, and/or the like, although various embodiments may provide advantages in a number of different contexts. Certain embodiments may provide real-time asset inventory and/or tracking technology to offer a mobile solution that can improve workforce productivity, minimizes equipment downtime, minimize stock levels for parts and equipment, and reduce operational costs.

In an exemplary embodiment, the tools and techniques employ a mobile asset tracking system installed in (or on) a vehicle. Any assets of interest can be associated with a tracking device (such as a tag, etc.), which may be affixed directly to (or integrated with) the asset (in the case, for example, of a tool, test equipment, etc.), on or in the asset's packaging (e.g., on the shipping box for a cable television transceiver, etc.), on or in an identification badge (for tracking personnel), etc. In a particular aspect, certain embodiments employ, as tracking devices, tags compliant with the Institute of Electrical and Electronics Engineers ("IEEE") 1902.1 standard, which specifies a long-wave, magnetic communication transport. Of course, other types of tracking devices may be used alternatively and/or in addition to IEEE 1902.1 tags.

The mobile asset tracking system, then, can include one or more transceivers to receive data from these tracking devices. (For example, such a transceiver might comprise an IEEE 1902 tag reader.) In an aspect, a plurality of transceivers may be arranged throughout a vehicle in order to identify a location, within a vehicle, of a particular tracking device (and thereby, the location of the asset associated with the tracking device). In any event, these transceiver(s) can be used to determine, at a given point in time, whether the asset is located within a vehicle.

This knowledge can be useful in a number of ways; merely by way of example, the continued presence of a tool in a repair van may indicate that the tool is seldom used by the technician (assuming the tool would have to be removed from the van to be used), which might lead to a determination that the tool is unnecessary to the technician's work and need not travel in the van on a daily basis; this determination can result in many different types of efficiencies; for example, fuel efficiency and vehicle wear-and-tear in a fleet can be improved by removing unnecessary tools from the fleet; likewise, substantial cost savings may be realized by outfitting vehicles only with the tools necessary for the work of the technicians associated with those vehicles.

In certain embodiments, the mobile asset tracking system includes a communication interface that can provide communication with a centralized asset tracking computer system. This communication interface can be used to transmit asset-tracking data (including without limitation some or all of the data received from the tracking devices) to the asset management system. The asset management system, based on this data, can track the locations of various assets and can provide visibility into the locations and/or use of those assets. In a particular aspect of some embodiments, this visibility may be displayed to a user in real time; for example, by displaying a map with the locations of various assets superimposed on the map, by displaying a table of assets with corresponding locations, and/or the like.

In other embodiments, the asset tracking computer system may be configured to provide alerts if the location of an asset falls outside specified parameters. These alerts may be communicated to one or more entities (e.g., by transmitting an alert to a technician at a vehicle in which the asset is (or should be) located, by displaying an alert for a user, by transmitting an alert to a supervisor, etc.). These alerts beneficially can provide users with the ability to detect mis-located assets and take corrective action while such action is still possible.

In some cases, a vehicle data acquisition system may be employed to provide data (including location data, movement data, speed data, and/or the like) about the vehicle in which the asset is (or should be) located. Merely by way of example, a vehicle data acquisition system might include a global navigation satellite system ("GNSS") transceiver and/or other position sensors that can detect the location and/or movement of a vehicle; data from the vehicle data acquisition system might be used by the asset tracking computer system to identify a location of the mobile asset tracking system; this location which can then be used to infer a location of an asset having a tracking device in communication with the mobile asset tracking system.

The tools provided by various embodiments of the invention include, without limitation, methods, systems, and/or software products. Merely by way of example, a method might comprise one or more procedures, any or all of which are executed by a computer system. Correspondingly, an embodiment might comprise a computer system configured with instructions to perform one or more procedures in accordance with methods provided by various embodiments. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

One set of embodiments provides methods. An exemplary method of tracking an asset might comprise associating a tracking device with the asset and receiving, at a mobile asset tracking system associated with a vehicle, information from the tracking device. The method might further comprise transmitting, from the mobile asset tracking system, asset tracking data comprising at least a portion of the information received from the tracking device. The asset tracking data might be received at an asset tracking computer system The method, in an embodiment, further comprises identifying, at the asset tracking computer system, a location of the mobile asset tracking system. The method may further comprise identifying the asset, based at least in part on the asset tracking data. In an embodiment, the method further comprises updating, at the asset tracking server, an asset database with data correlating the asset with the location of the mobile asset tracking system.

Another set of embodiments provides systems. An exemplary system for tracking an asset might comprise a mobile asset tracking system associated with a vehicle and an asset tracking computer system, which might be remote from the vehicle. The asset tracking computer system might be in communication the mobile asset tracking system.

The mobile asset tracking system might comprise (and/or be in communication with) one or more tracking devices, including in particular a first tracking device associated with a first asset. The mobile asset tracking system might further comprise one or more transceivers for receiving data from the one or more tracking devices, including a first transceiver for receiving information from the first tracking device, and/or a communication interface in communication with the one or more transceivers and configured to transmit asset tracking data. The asset tracking data might comprise at least a portion of the information received from the first tracking device.

The asset tracking computer system, in an embodiment, comprises one or more processors and a computer readable storage medium in communication with the one or more processors. The computer readable storage medium might have encoded thereon a set of instructions that are executable by the one or more processors to perform one or more operations.

Merely by way of example, the set of instructions might comprise instructions for receiving the asset tracking data, instructions for identifying a location of the mobile asset tracking system, and/or instructions for identifying the asset, based at least in part on the asset tracking data. The set of instructions might further comprise instructions for updating an asset database with data correlating the asset with the location of the mobile asset tracking system.

A further set of embodiments provides apparatus. An apparatus in accordance with a particular embodiment comprises a computer readable storage medium having encoded thereon a set of instructions that are executable by a computer system to perform one or more operations. Merely by way of example, the set of instructions might comprise instructions for associating a tracking device with an asset. Alternatively and/or additionally, the set of instructions might comprise instructions for receiving, from a mobile asset tracking system associated with a vehicle, asset tracking data, the asset tracking data comprising information received by the mobile asset tracking system from the tracking device. The set of instructions might also include instructions for identifying a location of the mobile asset tracking system, instructions for identifying the asset (e.g., based at least in part on the asset tracking data), and/or instructions for updating an asset database with data correlating the asset with the location of the mobile asset tracking system.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 7 is an exemplary screen display illustrating a table listing a plurality of tagged assets, in accordance with various embodiments.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments provides tools and techniques for tracking assets, such as high-value tools, customer equipment, testing equipment, technicians, and/or the like. Specifically, in accordance with some embodiments, these tools and techniques can be used to track assets in a mobile environment (such as in a delivery truck, installation van, and/or the like). In particular embodiments, the tools and techniques may have particular value for a business with a mobile workforce, such as a utility, cable television provider, equipment installation and/or repair business, and/or the like, although various embodiments may provide advantages in a number of different contexts. A variety of exemplary use cases are described herein to illustrate some features and benefits of certain embodiments; from this disclosure, one of skill in the art understand that various embodiments can be used in a variety of situations, and that these exemplary use cases should not be considered limiting in any regard.

Figure 1:
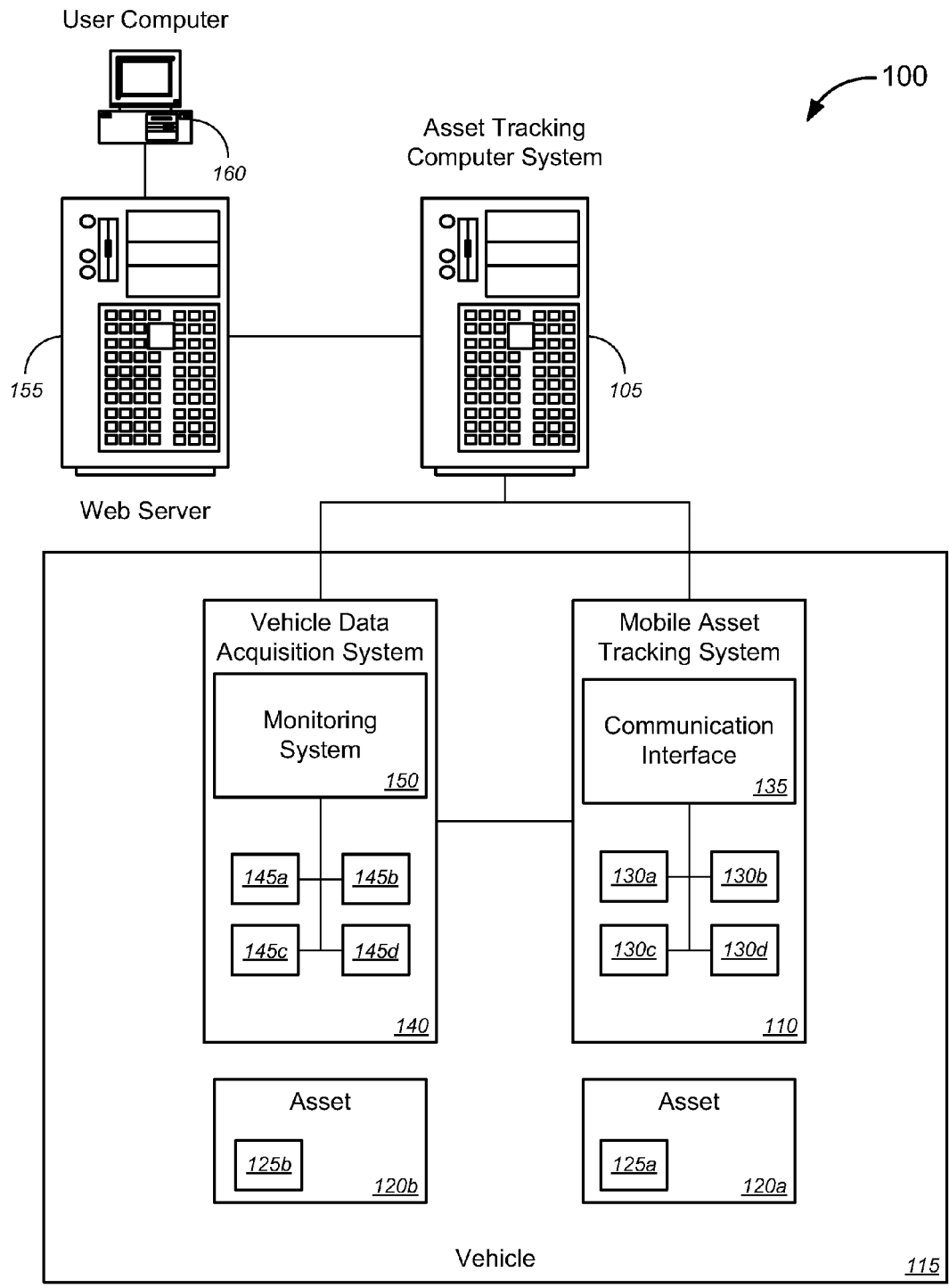
FIG. 1 is a block diagram illustrating a system for tracking an asset, in accordance with various embodiments.

FIG. 1 depicts a system 100 for tracking assets, in accordance with one set of embodiments. The system 100 includes an asset tracking computer system 105 in communication with a mobile asset tracking system 110 installed in (or on) a vehicle 115. Any of a variety of technologies, including wireless (e.g., Wireless WAN, cellular, GSM, CDMA, WiFi, WiMAX, etc.) communication, satellite communication, and/or the like may be used to provide communication between the mobile asset tracking system 110 and the asset tracking computer system 105. In particular embodiments, the vehicle 115 may be a fleet vehicle, such as a utility service van or the like.

Any asset 120 of interest can be associated with a tracking device (such as a tag, etc.) 125, which may be affixed directly to (or integrated with) the asset (in the case, for example, of a tool, test equipment, etc.), on or in the asset's packaging (e.g., on the shipping box for a cable television transceiver, etc.), on or in an identification badge (for tracking personnel), etc. There may be multiple assets 120a, 120b, each with an associated wireless asset-tracking device 125a, 125b, respectively, in a given vehicle 115.

These wireless asset-tracking devices 125 can employ any of a variety of technologies that allow for identification and/or tracking of an item wirelessly. Many such wireless asset-tracking devices 125 may take the form of unobtrusive tags that can be affixed to, placed within, integrated with, and/or manufactured in various assets to be tracked (and/or the packaging of such assets). Merely by way of example, certain embodiments might employ, as wireless asset-tracking devices, tags compliant with the Institute of Electrical and Electronics Engineers ("IEEE") 1902.1 standard, which specifies a long-wave, magnetic communication transport. A particular embodiment, for example, may employ RUBEE™ tags commercially available through Visible Assets, Inc., which can source RUBEE™ tags in conjunction with its patented designs. Additionally and/or alternatively, other types of wireless asset-tracking devices may be used. Examples can include, without limitation, radio frequency identification ("RFID") tags (e.g., tags compliant with ISO/IEC 18000 and related standards), ZIGBEE™ devices and/or other IEEE 802.15 compliant devices, devices capable of communicating via Wi-Fi, CDMA, GSM, WiMAX, and other wireless standards.

The mobile asset tracking system 110, then, can include one or more wireless asset-tracking transceivers 130 to send/receive data to/from these wireless asset-tracking devices 125. Such transceivers 130 may transmit and/or receive data to/from a particular type of wireless asset-tracking device 125. Accordingly, the nature of the transceiver 130 generally will correspond to the type of tracking device 125 that is employed. To give but a few examples, such a transceiver 130 might comprise RUBEE tag reader, an RFID tag reader, and/or the like. Together, a system of one or more wireless asset-tracking devices 125 and one or more corresponding wireless asset-tracking transceivers 130 (and/or the components thereof) can be considered a "wireless tracking system." The mobile asset tracking system 110, therefore, might comprise one or more wireless tracking systems. For example, in one aspect, a plurality of transceivers 130a-130d may be arranged throughout the vehicle 115 in order to identify a location, within a vehicle, of a particular tracking device 125a (and thereby, to identify the location of the asset 120a associated with the tracking device 125a). One skilled in the art will appreciate that certain types of wireless asset-tracking receivers, such as IEEE 1902.1 transceivers, for example, can be tuned to have relatively precise detection radii and/or can be arranged so as to "shape" a detection area to fit a particular volume. Based on these principles, for example, a plurality of transceivers 130a-d may be arranged to detect a tracking device in a driver's seat of the vehicle, another tracking device associated with an asset in a passenger's seat of the vehicle, and one or more tracking devices associated with assets in various locations of the cargo bay (or bed) of a vehicle. In any event, these transceiver(s) can be used to determine, at a given point in time, whether the asset is located within a vehicle. This knowledge can be useful in a number of ways, as illustrated in more detail in the exemplary use cases described below.

In certain embodiments, the mobile asset tracking system includes a communication interface 135 that can provide communication with the centralized asset tracking computer system 105. This communication interface 135 can receive data from (or via) the transceivers 130 and transmit data to the asset tracking computer system 105, but may also provide additional functionality, such as bidirectional data transfer, may actually include processing functionality, such that it can serve as an onboard computer in the vehicle (in some cases). In some cases, the communication interface 135 will include both local area (e.g., WiFi, Bluetooth, Ethernet, serial, USB, etc.) communication facilities (which can be used to communicate with the transceivers 130) and wide area (e.g., Wireless WAN, satellite, cellular, CDMA, GSM, satellite, etc.) communication facilities (which can be used, inter alia, to communicate with transceivers 130). In some cases, a communication interface 135 may serve as a transceiver 130 (or vice versa), in which case the communication interface may include appropriate facilities for communicating directly with tracking devices 125 (e.g., IEEE 1902.1 hardware).

Hence, the communication interface 135 can be used to transmit asset tracking data (including without limitation some or all of the data received from the tracking devices 130) to the asset management computer system 105 and/or, in some cases, to receive data (such as queries) from the asset tracking computer system 105 and/or relay that data to the transceivers 130 (and/or on to the tracking devices 125) as necessary, for example to update data stored in the tracking devices 125. The asset management computer system 105, based on this data, can track the locations of various assets 120 and can provide visibility into the locations and/or use of those assets 120. In a particular aspect of some embodiments, this visibility may be displayed to a user in real time, for example, by displaying a map with the locations of various assets superimposed on the map, by displaying a table of assets with corresponding locations, and/or the like.

In some cases, a vehicle data acquisition system 140 may be employed to provide data (including location data, movement data, speed data, and/or the like) about the vehicle 115 in which an asset 120 is (or should be) located. An example of a vehicle data acquisition system 140 is the Internet Location Manager™ family of products available from Trimble Navigation Limited. The vehicle data acquisition system 140 may include a variety of sensors 145 to monitor various operating parameters of the vehicle 115. Of particular relevance to this example, a vehicle data acquisition system 140 might include sensors 145, such as a global navigation satellite system ("GNSS") transceiver and/or other position sensors that can detect the location and/or movement of a vehicle. The vehicle data acquisition system 140 may also include a monitoring system 150 configured to receive data from the sensors 145 and communicate that data to the asset tracking computer system 105. The data from the vehicle data acquisition system 140 might be used by the asset tracking computer system 115 to identify a location of the mobile asset tracking system 110, which can then be used to infer a location of an asset having a tracking device in communication with the mobile asset tracking system 110; to determine a status (e.g., running, not running, moving, stationary, etc.) of the vehicle 115; and/or to monitor other operating parameters of the vehicle 115.

In some cases, the vehicle data acquisition system 140 (and/or components thereof) may comprise, may be in communication with, and/or be integrated with, the mobile asset tracking system 110. Merely by way of example, a single communication interface 135 might provide communication between the asset tracking computer system 105 and both the mobile asset tracking system 135 and the vehicle data acquisition system 140. Similarly, the communication interface 135 might serve as the monitoring system 150 of the vehicle data acquisition system. Other combinations are possible as well.

In an embodiment, the asset tracking computer system 105 comprises (or is in communication with a web server 155, which can be used to generate web pages for displaying information about assets 120 and/or their locations (as well as other information about the vehicle 115) to be transmitted to a user computer 160 for display to a user. Alternatively and/or additionally, the asset tracking computer system 105 may be in direct communication with the user computer 160, which might have installed thereon a dedicated client application for displaying information about vehicles 115, assets 120, and/or their locations. Although only one user computer 160 is illustrated by FIG. 1, the system 100 might include a plurality of user computers, including, in some cases, a user computer located in the vehicle (and indeed, might serve as the communication interface 135 for the mobile asset tracking system 110 in some embodiments), a user computer in a warehouse, in a manager's office, and/or the like. In some cases, a user computer can be any computer with access via a network (e.g., the Internet) to the web server 155 and/or the asset tracking computer system 105. Exemplary arrangements of the user computer 160, web server 155 and/or asset tracking computer system 105 are described with respect to FIGS. 5 and 6, below.

Similarly, while FIG. 1 illustrates only one vehicle, it is anticipated that an asset management system will serve a plurality of vehicles, each carrying one or more assets and configured similarly to the vehicle 115 of FIG. 1. Likewise asset tracking systems similar to the mobile asset tracking system 110 of FIG. 1 (which might, for example, each comprise one or more wireless tracking systems) could be installed in warehouses, stock rooms, and/or the like (although such systems may not be mobile and/or might comprise items such as handheld transceivers, etc.) for tracking assets that are not currently located in vehicles.

Figure 2:
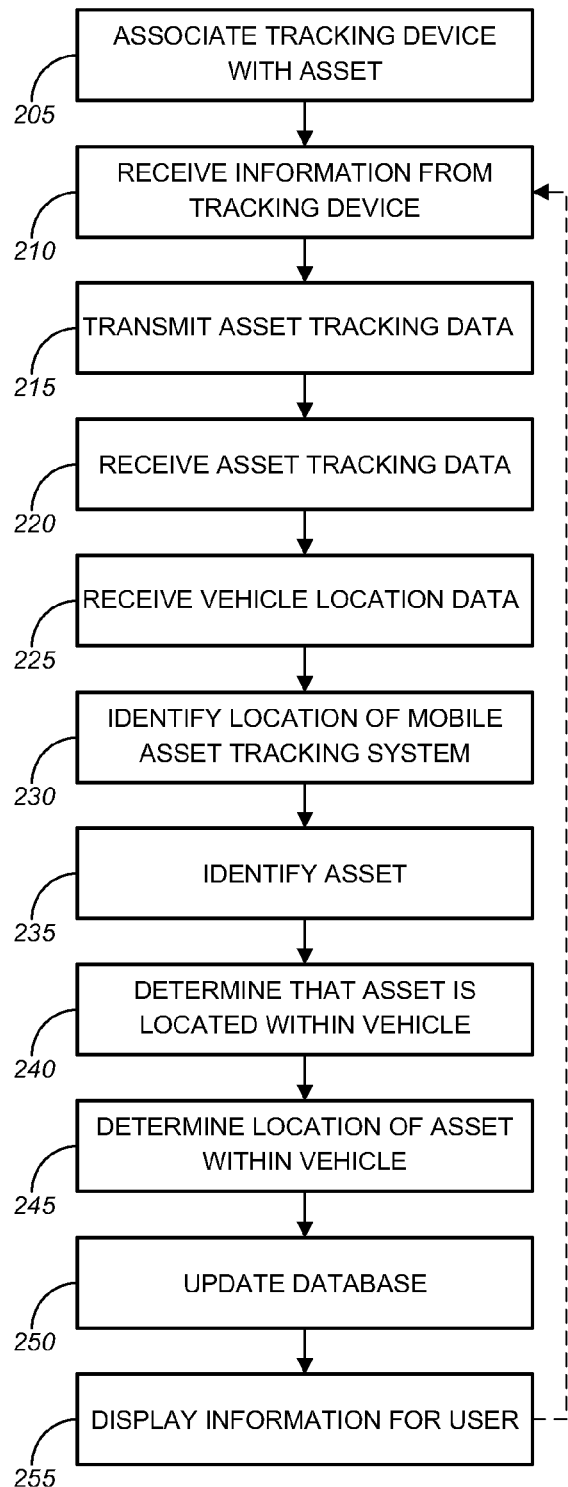
FIGS. 2 and 3 are process flow diagrams illustrating methods for tracking an asset, in accordance with various embodiments.
Figure 3:
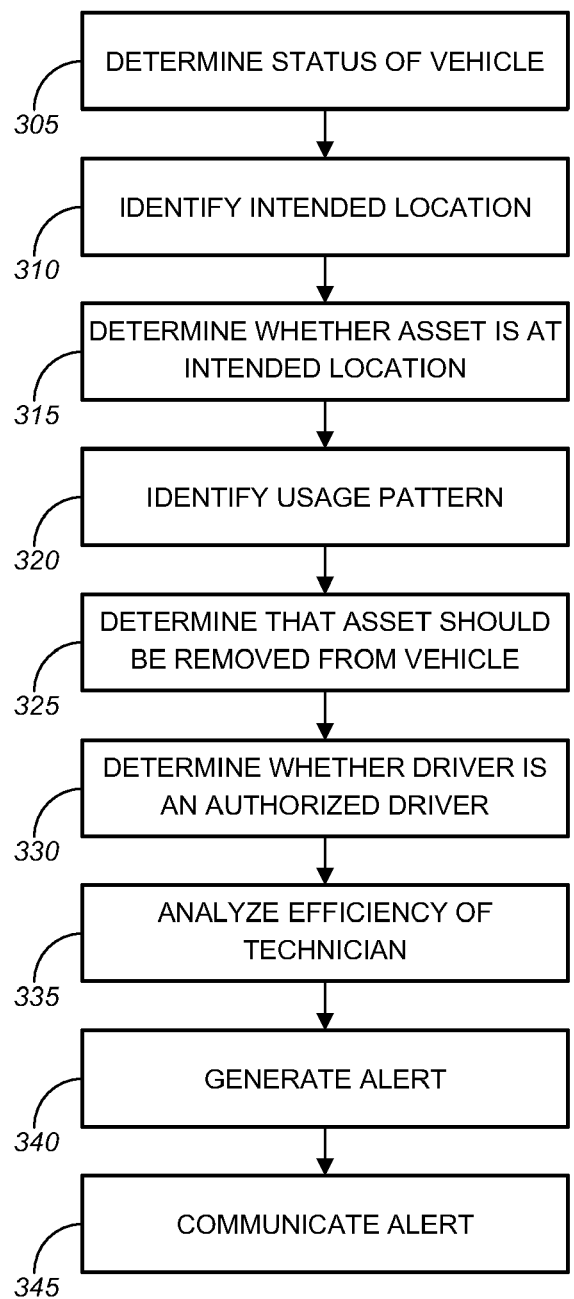

FIGS. 2-3 illustrate methods that can be used to track an asset, particularly in a mobile environment. While the methods of FIGS. 2-3 are illustrated, for ease of description, as different methods, it should be appreciated that the various techniques and procedures of these methods can be combined in any suitable fashion, and that, in some embodiments, the methods depicted by FIGS. 2-3 can be considered to be interoperable and/or to be portions of a single method. Moreover, while the methods illustrated by FIGS. 2-3 can be implemented by (and, in some cases, are described below with respect to) the system 100 of FIG. 1 (and/or components thereof), these methods can be implemented using any suitable hardware implementation. Conversely, while the system 100 of FIG. 1 (and/or components thereof) can operate according to the methods illustrated by FIGS. 2-3 (e.g., by executing instructions embodied on a computer readable medium), the system 100 can also operate according to other modes of operation and/or perform other suitable procedures.

For example, FIG. 2 illustrates a method 200 of tracking an asset in a mobile environment, such as a vehicle. The method 200 comprises associating a tracking device with an asset (block 205). An exemplary tracking device might be a wireless asset-tracking device, as described above. In an aspect, associating a tracking device with an asset might comprise creating a record in a database that correlates the asset with an identifier of the tracking device. In other embodiments, associating a tracking device with an asset might comprise affixing the tracking device to the asset (and/or to an item in proximity with the asset, such as packaging for the asset, an identification tag of an individual, and/or the like), inserting the tracking device into the asset (and/or manufacturing the asset with the tracking device incorporated within), and/or the like. In some cases, the tracking device might have data storage capabilities, and associating the tracking device with the asset might comprise storing, in the tracking device's data storage, information (such as an asset identifier) about the asset. Other techniques may be used as well.

The method 200 further comprises receiving, at a mobile asset tracking system, information from the tracking device (block 210). In many cases, the nature of the information received from the tracking device might depend on the nature of the tracking device itself. Merely by way of example, in a passive RFID device, the information received from the tracking device might simply be an identifier of the tracking device. For more sophisticated tracking devices, the information received from the tracking device might include data about the asset itself (such as an identifier and/or description of the asset, a historical account of the asset's provenance, and/or the like).

At block 215, the method 200 comprises transmitting, from the mobile asset tracking system, a set of asset tracking data. This asset tracking data can include, without limitation, some or all of the information (e.g., an identifier of the asset and/or of the tracking device) received from the tracking device. The set of asset tracking data might also include additional data, such as a time/date stamp, location information about the location of the mobile asset tracking system (which might be obtained from a vehicle data acquisition system, as described below in more detail, and/or from separate positional sensors incorporated within and/or in communication with the mobile asset tracking system), and/or the like. In some cases, the asset tracking data might not include information received from the tracking device; indeed the lack of such information might be an indicator that the asset is no longer located in the vehicle; this information might be relayed as part of the asset tracking data. The method 200 further comprises receiving the asset tracking data at the asset tracking computer system (block 220)

In some embodiments, asset tracking computer system might identify the location of the asset. This identification can be accomplished in a variety of ways. Merely by way of example, in some embodiments, the method 200 comprises identifying the location of the mobile asset tracking system (block 230). For instance, in some embodiments, the asset tracking data might include information about the location of the mobile asset tracking system, as described above. In other embodiments, the asset tracking computer system might be in communication with a vehicle data acquisition system (which, as noted above, may be integrated with the mobile asset tracking system, in communication with the mobile asset tracking system, or wholly separate from the mobile asset tracking system), and/or the asset tracking computer system might receive, from the vehicle data acquisition system, vehicle location data that identifies the location of the vehicle (block 225), perhaps in response to a query of the vehicle data acquisition system by the asset tracking computer system. Since the mobile asset tracking system is associated with the vehicle, the location of that system can be inferred from the location of the vehicle. Thus, however accomplished, the method 200 may include identifying a location of the mobile asset tracking system (block 230).

The method 200 may also include identifying the asset at the asset tracking computer system (block 235). Generally, the asset is identified based on the received asset tracking data. Merely by way of example, as noted above, in some cases, the asset tracking data might include an identifier of the asset itself; and this identifier can be used to identify the asset. In other cases, the asset tracking data might include an identifier of the tracking device associated with the asset, and the asset tracking computer system can identify the asset by searching a database for the identifier of the tracking device and/or any other appropriate identifying information provided in the asset tracking data. Once the asset has been identified at the asset tracking computer system, the asset tracking computer system can correlate the mobile asset tracking system's location with the identification of the asset to determine a location of the asset.

In some cases, the method 200 might comprise determining that the asset is located within the vehicle (block 240). Essentially, if the asset tracking data from the mobile asset tracking system indicates that the mobile asset tracking system received information from the tracking device, that indicates that the tracking device (and therefore the asset) is located within the vehicle. In other cases, the method 200 includes determining a location of the asset within the vehicle (block 245). For instance, as noted above, transceivers can be arranged so as to provide information (e.g., based on which transceiver(s) receive data from the tracking device) about a location of the asset within the vehicle. Merely by way of example, if a transceiver is configured to read data from tracking devices proximate to the driver's seat of a vehicle, and that transceiver receives information from a tracking device associated with a driver's identification badge, the asset tracking computer system can infer that the driver is sitting in the vehicle's driver's seat. (Conversely, if the vehicle data acquisition system indicates that the vehicle is in motion and the transceiver is not receiving data from the tracking device associated with the driver's badge, the asset tracking computer system might infer that an unauthorized driver is driving the vehicle.) As another example, transceivers might be positioned to allow visibility into which portion of a vehicle's cargo bay contains a particular asset, which can provide more expeditious access to that asset.

At block 250, the method 200 comprises updating, at the asset tracking computer system, an asset database with a location of the asset and/or data identifying such a location (in some cases, this might comprise data correlating the asset with the location of the mobile asset tracking system). The database might also be updated to include additional information, such as a date/time at which the asset tracking information (on which the derived location is based) was current.

At block 255, the method 200 comprises displaying, for a user, information about the location of the asset. A variety of techniques may be used to display information about the location of the asset. Merely by way of example, in some cases, a map may be displayed, with the location(s) of one or more assets superimposed on the map. In other cases, a table listing one or more assets and corresponding location(s). In some cases, the table might include additional information about the asset, including an indicator that information has not been received (perhaps over a certain time period) from the tracking device associated with the asset, which might imply that the asset is missing.

Merely by way of example, FIG. 7 illustrates an exemplary screen display 700 with such information. The exemplary display screen 700 of FIG. 7 displays a table 705 that depicts the status of a plurality of assets that have been tagged with an associated mobile asset-tracking device. The table 705 comprises a plurality of rows 710, each corresponding to a tagged asset. The table 705 further comprises a plurality of columns 715-745, each of which provides information about the assets (such that a cell at the intersection of a particular column and row provides information, the type of which is defined by the particular column, specific to the asset corresponding to the particular row).

In the exemplary screen display 700, several columns provide descriptive information about the identified assets. For example, a first column 715 displays information about a "Tag ID" that identifies a particular wireless asset-tracking device associated with each asset, and a second column 720 provides a description of each asset. A third column 725 provides a photo (or other graphical identifier) of each asset, and a fourth column 730 identifies a serial number of each asset. (It should be appreciated that other columns might provide other types of descriptive information about each asset.)

In addition to providing descriptive information, the example screen display also provides status information about each asset. In some embodiments, for example, a column 735 might indicate whether an asset is accounted for (e.g., that, within some specified threshold time, the wireless asset-tracking device associated with that asset had been identified by a wireless asset-tracking transceiver within the system) or whether, by contrast, the asset is considered missing (e.g., that a tracking device associated with that asset had not been scanned within the threshold time). Alternatively and/or additionally, similar information might be included in another column (e.g., by superimposing the information on an image, as illustrated by column 725 for the rows 710*b*, 710*c*, and 710*f*).

The display screen might also include a column 740 indicating a time and/or date corresponding to the last time an asset was successfully tracked by a wireless tracking system, and/or a column 745 to indicate an address (and/or other geographical information) indicating the last location at which the asset was tracked. This information can be used, for example, to identify the last known location of a missing asset, which can assist in the manual location of that asset.

In some cases, information (such as the display screen of FIG. 7, to name one example) may be displayed by a web browser; accordingly, displaying information for a user might comprise generating (e.g., at a web server incorporated within and/or in communication with the asset tracking computer system) a web page comprising the information and/or transmitting the web page for reception by a web browser on a user computer, which can display the web page for a user. This user computer might be a laptop or handheld computer used by an occupant of the vehicle, a service manager, a warehouse manager, and/or another other entity that needs visibility into the location of a tracked asset. In other embodiments, the display may be provided by a dedicated application (which might be a client application on a user computer in communication with the asset tracking computer system, etc.).

It should be noted that any or all of the operations described with respect to the method 200 might be repeated iteratively, as indicated by the broken line between blocks 255 and 210 (generally, the operation of associating the tracking device with the asset will not need to be repeated, although this can be done if necessary). Merely by way of example, the mobile asset tracking system might periodically (either on schedule, based on a query from the asset tracking computer system and/or based on a status change, such as movement, of the vehicle or asset) transmit updated asset tracking data (which may, but need not necessarily, include information received from the tracking device). In this way, location information about the asset may be updated in the asset database (and/or updated information may be displayed for the user). This updated data may indicate that the asset has not moved since the last set of asset tracking data was sent; alternatively, this data could indicate movement of the asset with the vehicle and/or could indicate that the asset has left the vehicle, returned to the vehicle, or moved within the vehicle. In an aspect, these updates may be displayed substantially in real time (i.e., as the data is received from the mobile asset tracking system) for the user, allowing a user to monitor the location of the asset with a high degree of precision.

FIG. 3 depicts a method 300 that illustrates several features of certain embodiments. For example, certain embodiments provide the ability to determine whether an asset has been left behind by a vehicle (which might be intended, in the case of a delivery, for example, or might be unintended, such as when a tool is left at a job site inadvertently). Hence, the method 300 comprises determining a status of the vehicle (block 305). In some cases, the status of the vehicle might be moving or stationary. (The asset tracking computer system might apply a hysteresis that requires a certain amount of movement or a certain velocity to identify a vehicle as moving, to avoid identifying a mere repositioning of the vehicle as a change in the status of the vehicle from stationary to moving.) In many cases, data from the vehicle data acquisition system can be used to identify the status of the vehicle.

The method 300 further comprises identifying an intended location of the asset (block 310). In some cases, the intended location might be identified based on user input. Merely by way of example, the asset database might include data (received from a user) that an asset should always be in (or proximate to) a vehicle when that vehicle is moving. To illustrate, consider the example of a "bucket truck," that has a bucket on an extending arm to allow a worker to attain a higher elevation; such a vehicle generally should not have the bucket extended while moving, for obvious reasons. To guard against this situation, the bucket may be associated with a tracking device, and a transceiver may be positioned so that it can communicate with the tracking device only when the bucket is lowered. The asset database might then include data indicating that the intended location of the bucket is down when the vehicle is in motion.

As another example, a device intended to be installed at a customer location might have associated data in the asset database indicating that the device is intended to be left at a particular location, while a tool or a piece of test equipment might be intended to be located in the vehicle any time the vehicle is leaving. As yet another example, if two technicians are assigned to a particular vehicle, but only one of them is authorized to drive the vehicle, the intended location of the driver would be in the driver's seat anytime the vehicle is moving. This information can be stored in the asset database and can be used by the asset tracking computer system to identify an intended location for each asset.

At block 315, the method comprises determining whether the asset is located at the intended location. In some cases, this determination can be made based on the identified intended location of the asset, the status of the vehicle and/or the actual location of the asset (based on the received asset tracking data). Hence, in the bucket-truck example above, if the status of the vehicle is that the vehicle is moving, the intended location of the bucket is in the lowered position while the vehicle is moving, and the asset tracking data indicates that the bucket is not in the lowered position, it can be determined that the bucket is not at its intended location.

In some embodiments, the method 300 comprises identifying a usage pattern of an asset, perhaps based on multiple sets of asset tracking data (block 320). For instance, in the bucket truck example described above, if the asset tracking data indicates, over a certain time period, that the bucket never leaves the lowered position, that might indicate that the bucket is seldom used; this can provide insight into whether the added expense of a bucket truck is really necessary for the work it is being used to perform. Similarly, if the asset data indicates that a tool never leaves a vehicle, the asset tracking computer system might identify that tool as one that is unnecessary. As yet another example, if the asset tracking data for a technician indicates that the technician frequently returns to the vehicle during a job, that data might identify a pattern of inefficiency in that technician (in that the technician fails to bring required tools to the job site and must return to the vehicle for them) or that a frequently-used tool cannot be removed from the vehicle, and that perhaps a portable version of the tool (if available) should be provided.

The method 300, in particular embodiments, comprises determining that an asset should be removed from a vehicle (block 325). Typically, this determination can be made based on identified usage patterns, as described above. Similarly, the method 300 may include determining, based on asset tracking data, whether a driver of a vehicle is an authorized driver (e.g., by identifying the status of the vehicle as in motion and by determining whether the asset tracking data indicates that the driver is in the driver's seat).

In another embodiment, the method 300 might include analyzing the efficiency of a technician, based on asset tracking data associated with that technician (block 335). For example, as noted above, asset-tracking data indicating that the technician frequently returns to the vehicle might indicate that the technician is not efficiently using the equipment provided. Asset tracking data about equipment leaving the vehicle might be used to support this analysis. Similarly, if the asset tracking data indicates that the technician stays in the vehicle for prolonged periods while the vehicle is not in motion, this might indicate that the technician does not timely proceed to the job site and/or does not timely begin work after arriving at the job site.

The method 300 may also comprise generating an alert (block 340). Alerts may be generated for a variety of reasons, and an alert often will be generated based at least in part on asset tracking data received by the asset tracking computer system. Merely by way of example, in some cases, if the asset tracking data indicates that a technician has been stationary in the vehicle for a specified period of time, and the vehicle data indicates that the vehicle is not moving, an alert may be generated to apprise a manager of the fact that the technician appears not to be working. As another example, an alert may be generated to indicate that an asset is not in its intended location (e.g., that a tool has been left at a job site). Other alerts may be generated to indicate that a tool has not been moved (and presumably has not been used) over a certain period of time. Based on this disclosure, one skilled in the art can appreciate that a wide variety of alerts may be generated by the asset tracking computer system.

The method 300 might further comprise communicating the alert to an entity (block 345). Alerts may be communicated in a variety of ways. Merely by way of example, an alert might be displayed for a user in a user interface that is also used to display location information about assets (e.g., in a client application, on a web page, etc.). In other cases, alerts may be transmitted as email messages, short messaging service ("SMS") messages, voice messages, and/or the like. In some cases, the recipient of an alert might not be human and/or might be an automated system; for example, an alert may be provided to an enterprise resource planning application, and/or the like, and/or an alert might be stored in a database; in such cases, the alert might comprise any inter-computer or inter-application message, such as an XML message, a SQL command, and/or the like. Hence, the technique for communicating the alert, as well as the entity to which the alert is communicated, may vary according to the nature of the alert. Merely by way of example, an alert regarding a tool left behind might be transmitted as an email message, an SMS message, and/or a voice message to the driver of the vehicle in which the tool should be located. Alerts about worker productivity might be transmitted to a manager of the worker at issue. An alert about a tool usage pattern might simply be stored in a database, might be sent as an email to a warehouse supervisor, and/or the like.

Exemplary Use Cases

Figure 4:
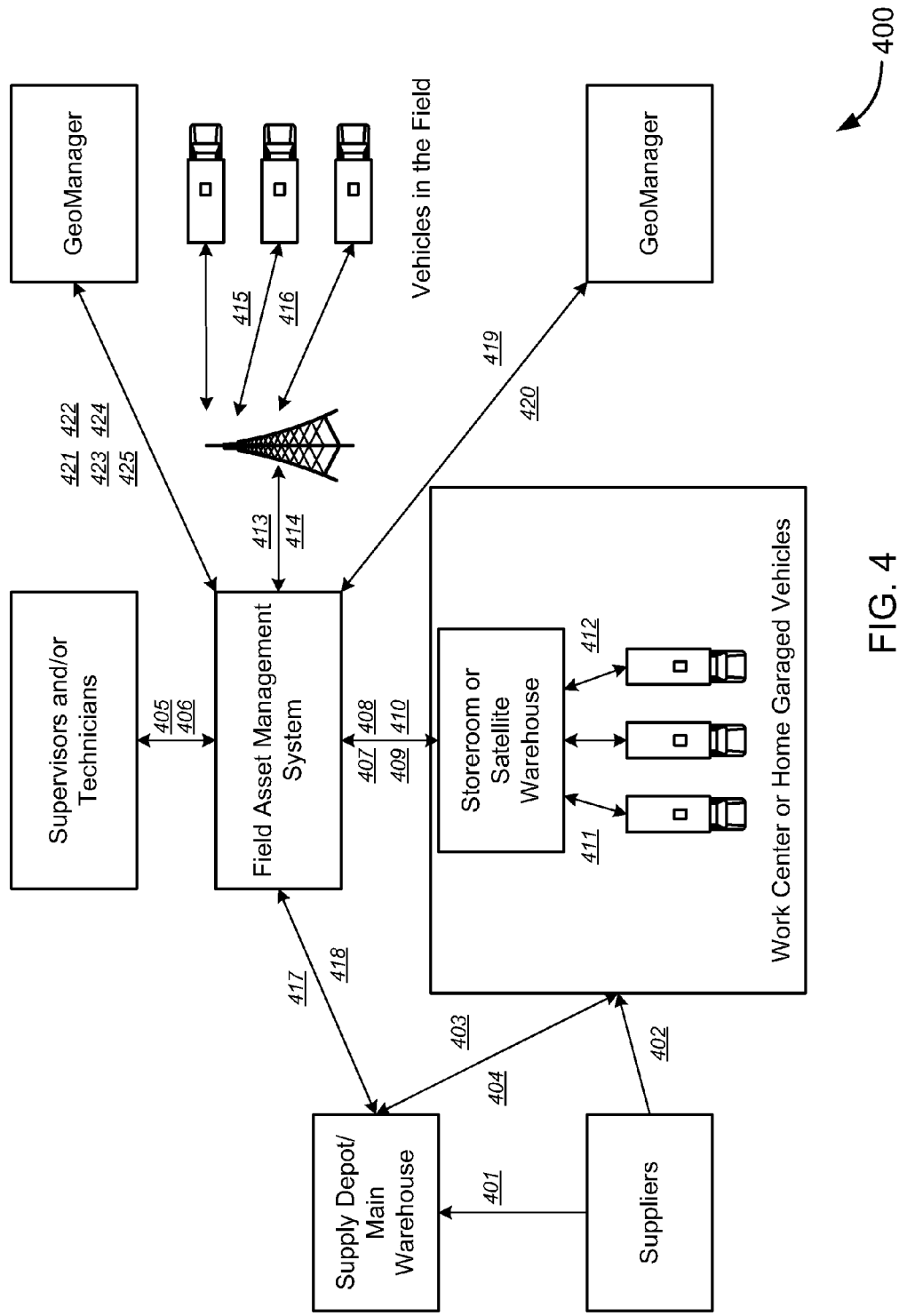
FIG. 4. is a diagram illustrating an asset flow and associated tracking operations, in accordance with various embodiments.

As noted above, various embodiments can be employed in a variety of use cases; a few such cases are described below. (It should be noted that the features and benefits of these exemplary use cases should not be considered essential or limiting in any way but are instead provided merely for illustrative purposes.) Merely by way of example, FIG. 4 illustrates a common asset flow in a mobile fleet, as well as the integration of asset tracking techniques with a field productivity and management ("FPM") system, such as the Geo-Manager™ solution commercially available from Trimble Navigation Limited. Such an FPM can be integrated with (and/or may comprise) the asset tracking computer system described above (which can function as the "Field Asset Management System" described in this example), and can be used to obtain data from vehicle data acquisition systems, warehouse management systems, and the like, and/or to provide a user interface for displaying asset location information, communicating alerts, and/or the like.

In accordance with embodiment illustrated by FIG. 4, vendors and suppliers receive orders for supplies, circuit boards, equipment, tools, and test sets (block 401). They fulfill these orders and send materials to the requesting company supply depot or warehouse. Some materials are sent directly from the supplier to the work centers needing the items, e.g. high value tools (block 402). Equipment, circuit boards, tools, and test sets are ordered from the company Supply Depot (block 403). The Supply Depot fulfills the order and sends the items to the Work Centers (block 404)

Supervisors or administrators tag items and update the Field Asset Management System with high value equipment, tools, test sets, and circuit board information (block 405). Reports and real-time queries are delivered to system users about the inventory identified within the system (block 406). The Field Asset Management System populates a database of items in the work center store room (block 407)

High Value items are stored temporarily in the work center storeroom for later use in a vehicle (block 408). The Store Room is used to temporarily store returned, defective, and unneeded items (block 409), and returned, defective, or no longer needed items are returned to the Supply Depot (block 410). Similarly, High Value items and other supplies are loaded onto vehicles from the Store Room (block 411), while returned, defective, or no longer needed items are removed from vehicles and temporarily stored in the Supply Room (block 412)

Data queries are sent out over a Wide Area Network from the field asset management system to query vehicle status on inventoried high value items or current vehicle driver (block 413). Return data messages from vehicles are transmitted back over the WAN to the field asset management system with inventory levels and driver identification (block 414). Vehicles receive the field asset management system data messages from the WAN (block 415), and vehicles respond back to the Field Asset Management System with inventory level and current driver information (block 416)

Inventory levels in Supply Depots are queried by the field asset management system for items tagged and stored in the Supply Depots (block 417), and response messages are transmitted from the Supply Depots to the field asset management system (block 418)

In some cases a Dispatch System can query the field asset management system for a specific asset by technician name, Warehouse location name, Supply Room name, technician ID, or vehicle ID (block 419), and the field asset management system will respond to Dispatch System with availability indication of requested asset (block 420).

Asset inventory info from a vehicle data acquisition system and/or a combined vehicle data acquisition system and mobile asset tracking system (such as the GeoManager Internet Location Manager family of products available from Trimble Navigation Limited) can be provided to the GeoManager on-line application and/or from GeoManager on-line to an on-line application of a field asset management system (block 421). Similarly, vehicle driver asset info can be provided from GeoManager Internet Location Manager to GeoManager on-line application and from GeoManager on-line to the field asset management system on-line application (block 422).

The field asset management system may provide on-line delivery of driver's seat information to GeoManager on-line application so GeoManager can automatically make driver to vehicle associations (block 423). The field asset management system may send a vehicle reader query to the mobile asset tracking system via GeoManager for real-time update of field asset status (block 424), and/or mobile asset tracking system might respond to real-time status inquiries via GeoManager in-vehicle hardware (e.g., a vehicle data acquisition system and/or mobile asset tracking system) and/or on-line application (block 425).

Inventory of Tools—In another exemplary use case, the asset tracking solutions described above might be used to maintain an inventory of tools. The inventory function can be accomplished by first ensuring that all assets to be inventoried (i.e. high value assets) and later tracked are tagged with wireless-asset tracking devices, a few examples of which are described above. Once tagged and brought within range of a tag reader, the reader will identify and begin the development of an "initial inventory" of tagged items in that space. The space could be a company warehouse, a company storeroom, or a technician vehicle depending upon where tagged items and tag readers are positioned within a customer's locations and vehicles. The field asset management system can make historical or current inventory information available to technicians and the company management team, depending upon the request, for all storerooms and vehicles equipped with wireless asset-tracking transceivers, a few examples of which are described above. These inventories can be used to ensure proper inventory sizing, assist in inventory audits, and to monitor shrinkage by location and by technician.

Usage Monitoring of Tools—These solutions can also be used to monitor usage of assets by first documenting the location of assets, such as tools, test sets, customer equipment, and facility equipment, in a particular storage site or vehicle, such as a company storeroom or a service technician vehicle. Once an initial inventory is established for each storage location, such as a vehicle, then assets discovered as missing between inventory cycles of a wireless tracking system could be noted as being used by a technician. Usage time can then be calculated by logging the time an item was no longer noted, or discovered, in a vehicle by the wireless tracking system in its read cycles and by noting its return to the vehicle in a subsequent read cycle. Usage could be assumed to be the time delta between off the vehicle and back on the vehicle. Frequency of usage calculations can be done and reports can be created showing how often, in a given day, month, or year, assets were used. Timestamps and addresses of wireless tracking systems inventories allow usage reports to be time and location based, so a manager can look to see when a high value asset left a vehicle and at what address that activity occurred. These kinds of reports can help managers monitor appropriate usage of certain assets and prevent unauthorized uses at some locations, such as an asset that left and returned to a vehicle at the technician's home.

Real-Time Queries for Tools—From time to time it is necessary to query supply rooms and vehicles for a real-time view of all assets in a vehicle or for a specific asset in a supply room or at a company Supply Depot. Traditionally, this has been a labor-intensive process that is performed by phone calls and physical scans of supply rooms and vehicles. With the field asset management system the ability is automated and needs no human intervention, as the field asset management system will have the ability, using the real-time GeoManager communications channel, to query in real-time a supply room or a vehicle reader a complete inventory or to query a supply room, vehicle, or groups of both for a specific wireless tracking system-tagged asset. This will assist technicians and supervisors in locating the nearest tool needed on a job or to find a lost tool that may have gotten transferred to the Supply Room by mistake, or more likely, a tool that accidentally got transferred to another technician's vehicle by mistake.

Inventory of Test Sets—The inventory function is accomplished by first ensuring that all assets to be inventoried (i.e. high value assets) and later tracked are tagged with wireless asset-tracking devices. Once tagged and brought within range of a wireless asset-tracking transceiver (e.g., tag reader), the reader will identify and begin the development of an "initial inventory" of tagged items in that space. The space could be a company warehouse, a company storeroom, or a technician vehicle depending upon where tagged items and tag readers are positioned within a customer's locations and vehicles. The field asset management system will make historical or current inventory information available to technicians and the company management team, depending upon the request, for all storerooms and vehicles equipped with wireless tracking systems. These inventories can be used to ensure proper inventory sizing, assist in inventory audits, and to monitor shrinkage by location and by technician. A field asset management system inventory of high value test set can not only establish a baseline of high value asset inventory and their location, but also can provide documentation for asset allocation purposes so that decisions can be based on where such test sets need to be located.

Monitoring Usage of Test Sets—The field asset management system can also monitor usage of assets by first documenting the location of assets, such as tools, test sets, customer equipment, and facility equipment, in a particular storage site or vehicle, such as a company storeroom or a service technician vehicle. Once an initial inventory is established the for each storage location, such as a vehicle, then assets discovered as missing between inventory cycles of a wireless tracking system could be noted as being used by a technician. Usage time can then be calculated by logging the time an item was no longer noted, or discovered, in a vehicle by the wireless asset-tracking transceiver in its read cycles and by noting its return to the vehicle in a subsequent read cycle. Usage could be assumed to be the time difference between when the item left the vehicle and when it returned to the vehicle. Frequency of usage calculations can be done and reports can be created showing how often, in a given day, month, or year, assets were used. Timestamps and addresses of wireless tracking system inventories allow usage reports to be time and location based, so a manager can look to see when a high value asset left a vehicle and at what address that activity occurred. These kinds of reports can help managers monitor appropriate usage of certain assets and prevent unauthorized uses at some locations, such as an asset that left and returned to a vehicle at the technician's home. Test set usage compliance reports can be establish that document that certain test sets left and returned to vehicles throughout a work day if those test sets and their use is a required part of the customer service process.

Real-Time Queries for Test Sets—From time to time it is necessary to query supply rooms and vehicles for a real-time view of all assets in a vehicle or for a specific asset in a supply room or at a company Supply Depot. Today that is done by phone calls and physical scans of supply rooms and vehicles. With the field asset management system, the ability is automated and needs no human intervention, as the field asset management system will have the ability, using the real-time GeoManager communications channel, to query in real-time a supply room or a vehicle reader a complete inventory or to query a supply room, vehicle, or groups of both for a specific asset tagged with a wireless asset-tracking device. Often times during a normal workday, technicians and their supervisors get involved in locating a particular high value test set for a job. This can occur because of a defective test set or because there are not enough high value test sets to assign to every technician. So a feature where a technician or a supervisor can query the field asset management system for the location of a particular test set, i.e. the closest test set to a given address. This query can include supply rooms and technician vehicles equipped with wireless tracking systems.

Inventory of Circuit Boards—The inventory function is accomplished by first ensuring that all assets to be inventoried (i.e. high value assets) and later tracked are tagged with wireless asset-tracking devices. Once tagged and brought within range of a corresponding transceiver (e.g., a tag reader), the reader will identify and begin the development of an "initial inventory" of tagged items in that space. The space could be a company warehouse, a company storeroom, or a technician vehicle depending upon where tagged items and tag readers are positioned within a customer's locations and vehicles. The field asset management system will make historical or current inventory information available to technicians and the company management team, depending upon the request, for all storerooms and vehicles equipped with wireless tracking systems. These inventories can be used to ensure proper inventory sizing, assist in inventory audits, and to monitor shrinkage by location and by technician. Circuit Board inventories can be accomplished easily and without human involvement in the inventory. These inventories can produce circuit board levels and allow management to make decision on how to allocate or re-allocate circuit boards based upon frequent inventories that do not require manual inventory effort.

Monitoring Usage of Circuit Boards—The field asset management system can also monitor usage of assets by first documenting the location of assets, such as tools, test sets, customer equipment, and facility equipment, in a particular storage site or vehicle, such as a company storeroom or a service technician vehicle. Once an initial inventory is established the for each storage location, such as a vehicle, then assets discovered as missing between inventory cycles of wireless tracking systems could be noted as being used by a technician. Usage time can then be calculated by logging the time an item was no longer noted, or discovered, in a vehicle by the wireless asset-tracking transceiver in its read cycles and by noting its return to the vehicle in a subsequent read cycle. Usage could be assumed to be the time delta between off the vehicle and back on the vehicle. Frequency of usage calculations can be done and reports can be created showing how often, in a given day, month, or year, assets were used. Timestamps and addresses of wireless tracking system inventories allow usage reports to be time and location based, so a manager can look to see when a high value asset left a vehicle and at what address that activity occurred. These kinds of reports can help managers monitor appropriate usage of certain assets and prevent unauthorized uses at some locations, such as an asset that left and returned to a vehicle at the technician's home. Circuit board usage can be documented even if the wireless asset-tracking device cannot be left on a particular circuit board. In most cases, circuit board boxes or envelopes tagged with wireless asset-tracking devices can be left on circuit board containers and re-cycled by creating a separate "re-cycle bin" antenna so that items, such as circuit board boxes that have been emptied, can be placed in that re-cycle bin and documented as such. Thus, a circuit board box will be shown as leaving a vehicle storage space and then being read by the re-cycle bin antenna and a wireless asset-tracking transceiver associated with that antenna. It can then be assumed that a circuit board container in the re-cycle bin indicates that a specific circuit board was used at that location.

Real-Time Query for Circuit Boards—From time to time it is necessary to query supply rooms and vehicles for a real-time view of all assets in a vehicle or for a specific asset in a supply room or at a company Supply Depot. Today that is done by phone calls and physical scans of supply rooms and vehicles. With the field asset management system, the ability is automated and needs no human intervention, as the field asset management system will have the ability, using the real-time GeoManager communications channel, to query in real-time a supply room or a vehicle reader a complete inventory or to query a supply room, vehicle, or groups of both for a specific asset tagged with a wireless asset-tracking device. For example a technician or a supervisor can query the field asset management system for the location of a specific circuit board so that the closest circuit board can be located for a given job quickly by the technician or his/her supervisor.

Inventory of Customer Equipment—The inventory function is accomplished by first ensuring that all assets to be inventoried (i.e. high value assets) and later tracked are tagged with wireless asset-tracking devices. Once tagged and brought within range of a tag reader, the reader will identify and begin the development of an "initial inventory" of tagged items in that space. The space could be a company warehouse, a company storeroom, or a technician vehicle depending upon where tagged items and tag readers are positioned within a customer's locations and vehicles. The field asset management system will make historical or current inventory information available to technicians and the company management team, depending upon the request, for all storerooms and vehicles equipped with wireless tracking systems. These inventories can be used to ensure proper inventory sizing, assist in inventory audits, and to monitor shrinkage by location and by technician. Customer equipment has considerable shrinkage and so an inventory that is repeatable with little or no human intervention and one that has inventory locations automatically identified and documented for customer equipment can not only document customer equipment inventories but also can reduce shrinkage by the fact that frequent inventories are being conducted.

Monitoring Usage of Customer Equipment—The field asset management system can also monitor usage of assets by first documenting the location of assets, such as tools, test sets, customer equipment, and facility equipment, in a particular storage site or vehicle, such as a company storeroom or a service technician vehicle. Once an initial inventory is established the for each storage location, such as a vehicle, then assets discovered as missing between inventory cycles of wireless tracking systems could be noted as being used by a technician. Usage time can then be calculated by logging the time an item was no longer noted, or discovered, in a vehicle by the wireless asset-tracking transceiver in its read cycles and by noting its return to the vehicle in a subsequent read cycle. Usage could be assumed to be the time delta between off the vehicle and back on the vehicle. Frequency of usage calculations can be done and reports can be created showing how often, in a given day, month, or year, assets were used. Timestamps and addresses of wireless tracking system inventories allow usage reports to be time and location based, so a manager can look to see when a high value asset left a vehicle and at what address that activity occurred. These kinds of reports can help managers monitor appropriate usage of certain assets and prevent unauthorized uses at some locations, such as an asset that left and returned to a vehicle at the technician's home. Customer equipment can either be equipped with a permanent wireless asset-tracking device that remains on the customer equipment for later inventory when that equipment is returned for whatever reason to the Communications Company providing the equipment initially. Or a re-cycle process can be established for boxes and envelopes that may contain customer equipment that is removed from the box with the box or envelop going into the vehicle re-cycle bin at the customer location indicating usage of the asset.

Real-Time Query for Customer Equipment—From time to time it is necessary to query supply rooms and vehicles for a real-time view of all assets in a vehicle or for a specific asset in a supply room or at a company Supply Depot. Today that is done by phone calls and physical scans of supply rooms and vehicles. With the field asset management system, the ability is automated and needs no human intervention, as the field asset management system will have the ability, using the real-time GeoManager communications channel, to query in real-time a supply room or a vehicle reader a complete inventory or to query a supply room, vehicle, or groups of both for a specific tagged asset. Customer equipment like set-top boxes is the subject of technician and supervisor searches when supplies are shorter than the customer service activity for a given area. In that case a technician or a supervisor can query other vehicles or the company supply rooms for a specific needed item of customer equipment.

Inventory of Facility Equipment—The inventory function is accomplished by first ensuring that all assets to be inventoried (i.e. high value assets) and later tracked are tagged with wireless asset-tracking devices. Once tagged and brought within range of a corresponding transceiver (e.g., a tag reader), the reader will identify and begin the development of an "initial inventory" of tagged items in that space. The space could be a company warehouse, a company storeroom, or a technician vehicle depending upon where tagged items and tag readers are positioned within a customer's locations and vehicles. The field asset management system will make historical or current inventory information available to technicians and the company management team, depending upon the request, for all storerooms and vehicles equipped with wireless asset-tracking transceivers. These inventories can be used to ensure proper inventory sizing, assist in inventory audits, and to monitor shrinkage by location and by technician. Company facility equipment has considerable shrinkage and so an inventory that is repeatable with little or no human intervention and one that has inventory locations automatically identified and documented for facility equipment can not only document facility equipment inventories but also can reduce shrinkage by the fact that frequent inventories are being conducted.

Monitoring Usage of Facility Equipment—The field asset management system can also monitor usage of assets by first documenting the location of assets, such as tools, test sets, customer equipment, and facility equipment, in a particular storage site or vehicle, such as a company storeroom or a service technician vehicle. Once an initial inventory is established the for each storage location, such as a vehicle, then assets discovered as missing between inventory cycles of wireless tracking system could be noted as being used by a technician. Usage time can then be calculated by logging the time an item was no longer noted, or discovered, in a vehicle by the wireless tracking system in its read cycles and by noting its return to the vehicle in a subsequent read cycle. Usage could be assumed to be the time delta between off the vehicle and back on the vehicle. Frequency of usage calculations can be done and reports can be created showing how often, in a given day, month, or year, assets were used. Timestamps and addresses of wireless tracking system inventories allow usage reports to be time and location based, so a manager can look to see when a high value asset left a vehicle and at what address that activity occurred. These kinds of reports can help managers monitor appropriate usage of certain assets and prevent unauthorized uses at some locations, such as an asset that left and returned to a vehicle at the technician's home. Knowing when and where company facility equipment left technician vehicles helps control shrinkage and document usage for company deployed asset documentation and damage claim reports.

Real-Time Query for Facility Equipment—From time to time it is necessary to query supply rooms and vehicles for a real-time view of all assets in a vehicle or for a specific asset in a supply room or at a company Supply Depot. Today that is done by phone calls and physical scans of supply rooms and vehicles. With the field asset management system, the ability is automated and needs no human intervention, as the field asset management system will have the ability, using the real-time GeoManager communications channel, to query in real-time a supply room or a vehicle reader a complete inventory or to query a supply room, vehicle, or groups of both for a specific tagged asset. Company faculty equipment like fiber optic terminals is often the subject of technician and supervisor searches when supplies are shorter than the facility maintenance activity for a given area or in a given crisis like a catastrophic facility equipment failure. In those cases a technician or a supervisor can query other company vehicles or supply rooms for a specific needed item of facility equipment.

Automated Driver-to Vehicle Association—A feature can be developed in GeoManager to query the field asset management system or to get a recurring technician to driver's seat to vehicle data so that GeoManager can automatically change in its administrative files the technician to vehicle assignments. This automated change can be driven by a technician's company identification badge (and/or an affixed or associated wireless asset-tracking device) being detected over a period of time in a given day in the driver's seat area of the technician vehicle. For example if a certain technician badge is detected for at least one hour in a given day in and out of the vehicle driver's seat then that technician will be automatically assigned that vehicle for the entire work day or for the morning or afternoon tour of a given day. This will automate a time-consuming and meticulous activity by GeoManager administrators and will ensure GeoManager report accuracy as well as that of dispatch system using real-time vehicle locations for more accurate dispatching of technician job assignments.

Monitoring of Time in Driver's Seat—The field asset management system can also monitor and report out on time spent by each technician in a vehicle driver's seat. This can document customer premise work effort or lack there of as well as what technician is in the driver's seat when a vehicle is reporting high speeds or other erratic behavior. Excessive driver seat occupation times can indicate poor productivity as well so an average driver seat time can help company management monitor proper technician work activity.

Real-Time Query for Driver—This feature can be helpful in a number of ways. First a real-time query can help company management associate vehicles and technicians needed for special dispatches. Second this feature can be used to ascertain what technician is noted as driving erratically by others or by GeoManager excessive speed exception reports. And finally, a real-time query of a technician with certain skill by the dispatch system can help that system create a better dispatch. For example, if a specialized vehicle is needed for an immediate dispatch and only if a specific technician is assigned that vehicle for that day then a dispatch system query to the field asset management system for what technician is assigned to a vehicle can assist the dispatch system in making a better dispatch decision.

Dispatch System Query for Driver/Vehicle Association—Dispatch systems using integrated GPS data to determine and use exact technician locations in real-time can make more accurate and efficient dispatch decisions. To do that reliably the dispatch system must have accurate driver to vehicle association throughout the day. So the dispatch system can be configured with the capability to query the field asset management system for Driver to Vehicle associations to give the automated dispatch equation in the dispatch system the benefit of an accurate and up-to-date technician to vehicle assignment table. More accurate and efficient dispatches will result. In addition, on occasion the dispatch system, when integrated to a real-time GPS system such as GeoManager, may query the field asset management system to ensure that a certain technician is assigned to a specific vehicle. This could be necessary to confirm in advance an assignment of a specialized vehicle for a service request such as work that requires a bucket truck or to rectify discrepancy in automatic technician to vehicle assignments.

Dispatch with Asset Availability Information—Prior to making a dispatch decision a dispatch system will ideally check to ensure that the dispatched technician and his/her assigned vehicle has needed the needed assets for the job being dispatched. To do that the dispatch systems must be able to quickly ascertain vehicle asset inventory, such as inventories of special tools or test equipment and of specific circuit board, customer equipment, or company facility equipment to accomplish the job to be dispatch. Real-time asset queries of vehicles and supply rooms supporting technicians can create an automated dispatch that ensure the technician will arrive at the job site equipped and ready to accomplish the task.

Inventory Alerts—Inventory alerts can be used to alert technicians or management that warehouse, supply rooms, or vehicles have reached a low enough level that technicians or management need to be alerted. This could be that the warehouse inventory count has gotten to a level of tools, test sets, company equipment, or customer equipment that requires notification. For example, once the warehouse gets to a level of 1000 set top boxes management needs to be alerted. Alerts could also be used to trigger re-ordering of such assets.

Usage Alerts—There are several usage alerts that could be deployed using the field asset management system and a wireless tracking system. For example, if there is a residential test set to be used on all jobs by technicians, then alerts and alert summary reports can be generated when such test sets are utilized, i.e. removed from a technician vehicle. Usage alerts could also be assigned to tags on ladders and buckets on vehicles so equipped to alert management or technicians that such items are being used.

Theft Alerts—Theft alerts could be established if items are removed from vehicles without authorization. This feature could be configured to work in several ways, such as alerting the technician that a certain tagged item, such as a tool, is no longer in the vehicle at the beginning of day or at vehicle start up. Theft alerts could also be used to alert a technician if he/she is away from a vehicle and a high value tagged up suddenly goes missing from the vehicle.

Left-Behind Alerts—Alerts could also be issued to technicians or management at engine start up that certain needed or inventory assets are not present in the vehicle. For example, if ladders or safety cones were there could be an alert to the technician to let them know that they are getting ready to leave an asset (e.g. ladder or safety cone) behind.

Figure 5:
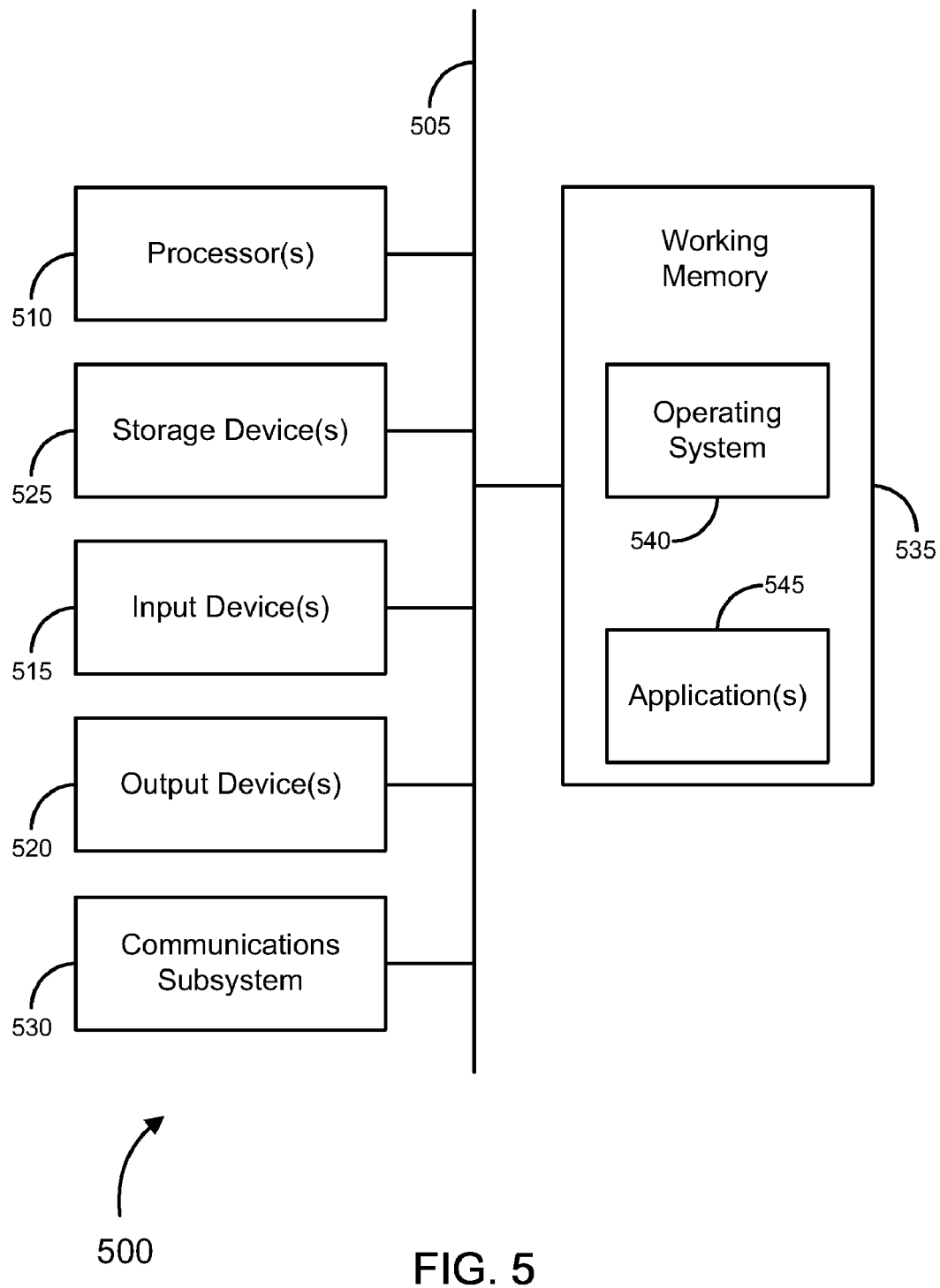
FIG. 5 is a generalized schematic diagram illustrating a computer system, in accordance with various embodiments of the invention.

FIG. 5 provides a schematic illustration of one embodiment of a computer system 500 that can perform the methods provided by various other embodiments, as described herein, and/or that can function as a vehicle data acquisition system (and/or components thereof), a mobile asset tracking system (and/or components thereof), an asset tracking computer system, a web server, and/or a user computer, in accordance with various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
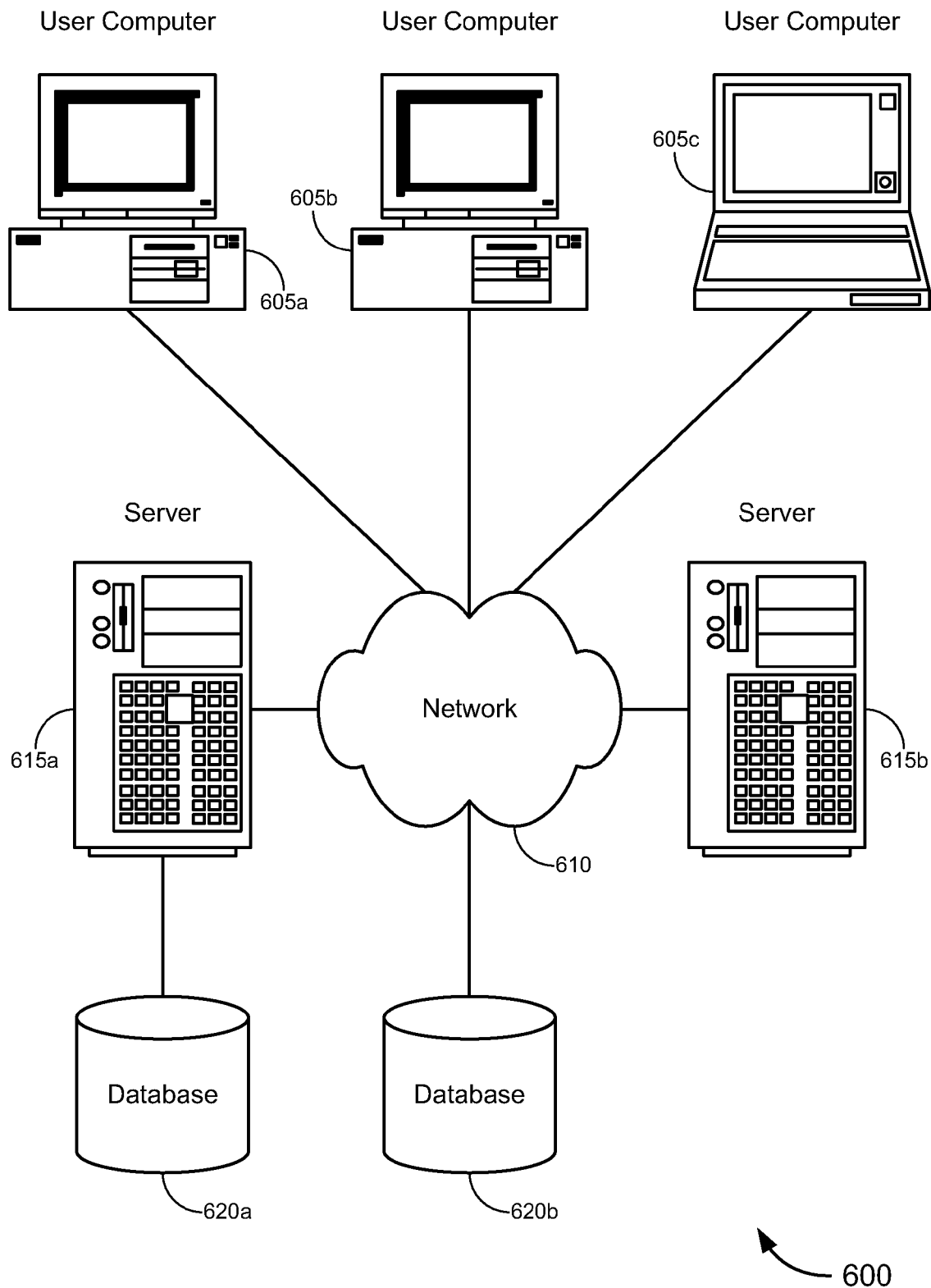
FIG. 6 is a block diagram illustrating a networked system of computers, which can be used in accordance with various embodiments of the invention.

A set of embodiments comprises systems for tracking assets and/or displaying information for assets about users. Merely by way of example, FIG. 6 illustrates a schematic diagram of a system 600 that can be used in accordance with one set of embodiments. The system 600 can include one or more user computers 605. The user computers 605 can be general-purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 605 can also have any of a variety of applications, including one or more applications configured to perform methods provided by various embodiments (as described above, for example), as well as one or more office applications, database client and/or server applications, and/or web browser applications. Alternatively, the user computers 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615. Merely by way of example, one or more server computers 615 may be configured (with a software application) to operate as a special-purpose computer that performs the functions of an asset tracking computer system, a FPM system (and/or a combination of the two), etc.

In some cases, one of the servers 615 may be a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 605 and/or another server 615. In some embodiments, an application server can create web pages dynamically for displaying the information in accordance with various embodiments, such as information about assets and/or their locations. Data provided by an application server may be formatted as one or more web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 635 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functions are ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of tracking an asset, the method comprising:
associating a tracking device with the asset;
receiving, at a mobile asset tracking system associated with a vehicle, information from the tracking device;
transmitting, from the mobile asset tracking system, asset tracking data comprising at least a portion of the information received from the tracking device;
receiving, at an asset tracking computer system, the asset tracking data;
identifying, at the asset tracking computer system, a location of the mobile asset tracking system;
identifying, at the asset tracking computer system, the asset, based at least in part the asset tracking data;
updating, at the asset tracking computer system, an asset database with data correlating the asset with the location of mobile asset tracking system;
receiving, at the asset tracking computer system, a plurality of sets of updated asset tracking data over a period of time; and
identifying a usage pattern of the asset, based on the plurality of sets of updated asset tracking data.

2. The method of claim 1, wherein the mobile asset tracking system is located within the vehicle.

3. The method of claim 1, wherein receiving information from the asset tracking device comprises receiving information transmitted primarily by long wave magnetic signals.

4. The method of claim 1, wherein receiving information from the asset tracking device comprises receiving information transmitted in compliance with the Institute of Electrical and Electronics Engineers ("IEEE") 1902.1 standards.

5. The method of claim 1, wherein identifying a location of the mobile asset tracking system comprises receiving vehicle location data from a vehicle data acquisition system associated with the vehicle.

6. The method of claim 1, further comprising:
determining, based on the asset tracking data, that the asset is located within the vehicle.

7. The method of claim 1, further comprising:
determining, based on the asset tracking data, a location of the asset within the vehicle.

8. The method of claim 1, further comprising:
displaying, for a user, information about a location of the asset.

9. The method of claim 8, wherein displaying information about the location of the asset comprises:
generating, at a web server, a web page comprising the information about a location of the asset; and
transmitting the web page for display by a web browser at a user computer.

10. The method of claim 8, wherein the information about a location of the asset comprises a map illustrating a location of the asset.

11. The method of claim 8, wherein the information about a location of the asset comprises a table listing one or more assets and a corresponding location of each of the one or more assets.

12. The method of claim 1, further comprising:
identifying an intended location of the asset; and
determining, based at least in part on the asset tracking data, whether the asset is at the intended location of the asset.

13. The method of claim 12, wherein identifying an intended location of the asset comprises determining a status of the vehicle.

14. The method of claim 13, wherein determining a status of the vehicle comprises receiving, at the asset tracking computer system, vehicle data obtained from a vehicle data acquisition system.

15. The method of claim 1, further comprising:
receiving, at the asset tracking computer system, updated asset tracking data.

16. The method of claim 15, wherein the asset tracking data indicates that the asset is within the vehicle, and wherein the updated asset tracking data indicates that the asset is no longer within the vehicle.

17. The method of claim 15, further comprising:
displaying, for the user, updated information about the location of the asset, based at least in part on the updated asset tracking data.

18. The method of claim 15, wherein displaying updated information about the location of the asset comprises displaying the updated information substantially in real time.

19. The method of claim 15, further comprising:
generating an alert based at least in part on the updated asset tracking data.

20. The method of claim 19, further comprising communicating the alert to an entity.

21. The method of claim 20, wherein communicating the alert to an entity comprises displaying the alert to the user.

22. The method of claim 20, wherein communicating the alert to an entity comprises transmitting the alert for reception by an occupant of the vehicle.

23. The method of claim 20, wherein communicating the alert to an entity comprises transmitting the alert for reception by an entity responsible for the asset.

24. The method of claim 1, further comprising:
determining that the asset should be removed from the vehicle, based on the identified usage pattern of the asset.

25. A method of tracking an asset, the method comprising:
associating a tracking device with the asset;
receiving, at a mobile asset tracking system associated with a vehicle, information from the tracking device;
transmitting, from the mobile asset tracking system, asset tracking data comprising at least a portion of the information received from the tracking device;

receiving, at an asset tracking computer system, the asset tracking data;

identifying, at the asset tracking computer system, a location of the mobile asset tracking system;

identifying, at the asset tracking computer system, the asset, based at least in part the asset tracking data;

updating, at the asset tracking computer system, an asset database with data correlating the asset with the location of mobile asset tracking system; and determining, based on the asset tracking data, a location of the asset within the vehicle.

26. The method of claim 25, wherein the asset is a human being.

27. The method of claim 26, further comprising determining, based at least in part on the asset tracking data, whether a driver of the vehicle is an authorized driver of the vehicle.

28. The method of claim 26, wherein the asset is a technician, the method further comprising analyzing an efficiency of the technician, based at least in part on the asset tracking data.

29. A system for tracking an asset, the system comprising:
a mobile asset tracking system associated with a vehicle, the mobile asset tracking system comprising:
one or more tracking devices, including a first tracking device associated with a first asset;
one or more transceivers for receiving data from the one or more tracking devices, including a first transceiver for receiving information from the first tracking device; and
a communication interface in communication with the one or more transceivers and configured to transmit asset tracking data, the asset tracking data comprising at least a portion of the information received from the first tracking device; and
an asset tracking computer system located remote from the vehicle and in communication with the mobile asset tracking system, the asset tracking computer system comprising one or more processors and a computer readable storage medium in communication with the one or more processors, the computer readable storage medium having encoded thereon a set of instructions that are executable by the one or more processors to perform one or more operations, the set of instructions comprising:
instructions for receiving the asset tracking data;
instructions for identifying a location of the mobile asset tracking system;
instructions for identifying the asset, based at least in part on the asset tracking data;
instructions for updating an asset database with data correlating the asset with the location of the mobile asset tracking system;
instructions for receiving, at the asset tracking computer system, a plurality of sets of updated asset tracking data over a period of time; and
instructions for identifying a usage pattern of the asset, based on the plurality of sets of updated asset tracking data.

30. They system of claim 29, wherein the first asset tracking device transmits data primarily by long wave magnetic signals.

31. The system of claim 29, wherein the first asset tracking device transmits data in compliance with the Institute of Electrical and Electronics Engineers ("IEEE") 1902.1 standard.

32. The system of claim 31, wherein the one or more transceivers is a plurality of transceivers, and wherein the plurality of transceivers is arranged about the vehicle to identify a location of the asset within the vehicle.

33. The system of claim 29, further comprising:
a vehicle data acquisition system comprising:
one or more sensors for obtaining data about a status of the vehicle;
a monitoring system for receiving, from the one or more sensors, the data about the status of the vehicle and for transmitting at least a portion of the data about the status of the vehicle.

34. The system of claim 33, wherein the one or more sensors comprises one or more sensors selected from the group consisting of a global navigation satellite system ("GNSS") transceiver, a movement sensor, and a speed sensor.

35. The system of claim 33, wherein the vehicle data acquisition system transmits data using the communication interface.

36. The system of claim 33, wherein the mobile asset tracking system is integrated with the vehicle data acquisition system.

37. The system of claim 33, wherein the set of instructions further comprises instructions for receiving the at least a portion of the vehicle status data, and wherein the instructions for identifying a location of the mobile asset tracking system comprise instructions for identifying a location of the mobile asset tracking system based at least in part on the at least a portion of the data about the status of the vehicle.

38. The method of claim 29, further comprising:
a web server, in communication with the asset tracking computer system, for generating a web page comprising information about a location of the asset and for transmitting the web page for display by a web browser at a user computer.

39. An apparatus, comprising:
a computer readable storage medium having encoded thereon a set of instructions that are executable by a computer system to perform one or more operations, the set of instructions comprising:
instructions for associating a tracking device with an asset;
instructions for receiving, from a mobile asset tracking system associated with a vehicle, asset tracking data, the asset tracking data comprising information received by the mobile asset tracking system from the tracking device;
instructions for identifying a location of the mobile asset tracking system;
instructions for identifying the asset, based at least in part on the asset tracking data;
instructions for updating an asset database with data correlating the asset with the location of the mobile asset tracking system;
instructions for receiving, at the asset tracking computer system, a plurality of sets of updated asset tracking data over a period of time; and
instructions for identifying a usage pattern of the asset, based on the plurality of sets of updated asset tracking data.

40. The apparatus of claim 39, wherein the set of instructions further comprises:
instructions for receiving vehicle location data from a vehicle data acquisition system associated with the vehicle;
wherein the instructions for identifying a location of the mobile asset tracking system comprise instructions for identifying a location of the mobile asset tracking system based at least in part in the vehicle location data.

41. The apparatus of claim 39, wherein the set of instructions further comprises:
instructions for displaying, for a user, information about a location of the asset.

42. The apparatus of claim 41, wherein the instructions for displaying information about a location of the asset comprise:
instructions for generating a web page comprising information about the location of the asset; and
instructions for transmitting the web page for display by a web browser at a user computer.

43. A system for tracking an asset, the system comprising:
a mobile asset tracking system associated with a vehicle, the mobile asset tracking system comprising:
one or more tracking devices, including a first tracking device associated with a first asset;
one or more transceivers for receiving data from the one or more tracking devices, arranged about the vehicle to identify a location of the asset within the vehicle, including a first transceiver for receiving information from the first tracking device; and
a communication interface in communication with the one or more transceivers and configured to transmit asset tracking data, the asset tracking data comprising at least a portion of the information received from the first tracking device; and
an asset tracking computer system located remote from the vehicle and in communication with the mobile asset tracking system, the asset tracking computer system comprising one or more processors and a computer readable storage medium in communication with the one or more processors, the computer readable storage medium having encoded thereon a set of instructions that are executable by the one or more processors to perform one or more operations, the set of instructions comprising:
instructions for receiving the asset tracking data;
instructions for identifying a location of the mobile asset tracking system;
instructions for identifying the asset, based at least in part on the asset tracking data;
instructions for updating an asset database with data correlating the asset with the location of the mobile asset tracking system; and
instructions for determining, based on the asset tracking data, a location of the asset within the vehicle.

44. A method of tracking a technician, the method comprising:
associating a tracking device with a technician;
receiving, at a mobile asset tracking system associated with a vehicle, information from the tracking device;
transmitting, from the mobile asset tracking system, asset tracking data comprising at least a portion of the information received from the tracking device;
receiving, at an asset tracking computer system, the asset tracking data;
identifying, at the asset tracking computer system, a location of the mobile asset tracking system;
identifying, at the asset tracking computer system, the technician, based at least in part the asset tracking data;
updating, at the asset tracking computer system, an asset database with data correlating the technician with the location of mobile asset tracking system; and
analyzing an efficiency of the technician, based at least in part on the asset tracking data.

45. A system for tracking a technician, the system comprising:
a mobile asset tracking system associated with a vehicle, the mobile asset tracking system comprising:
one or more tracking devices, including a first tracking device associated with a technician;
one or more transceivers for receiving data from the one or more tracking devices, including a first transceiver for receiving information from the first tracking device; and
a communication interface in communication with the one or more transceivers and configured to transmit asset tracking data, the asset tracking data comprising at least a portion of the information received from the first tracking device; and
an asset tracking computer system located remote from the vehicle and in communication with the mobile asset tracking system, the asset tracking computer system comprising one or more processors and a computer readable storage medium in communication with the one or more processors, the computer readable storage medium having encoded thereon a set of instructions that are executable by the one or more processors to perform one or more operations, the set of instructions comprising:
instructions for receiving the asset tracking data;
instructions for identifying, at the asset tracking computer system, a location of the mobile asset tracking system;
instructions for identifying, at the asset tracking computer system, the technician, based at least in part the asset tracking data;
instructions for updating, at the asset tracking computer system, an asset database with data correlating the technician with the location of mobile asset tracking system; and
instructions for analyzing an efficiency of the technician, based at least in part on the asset tracking data.

* * * * *